(12) United States Patent
Gehring

(10) Patent No.: US 9,809,962 B1
(45) Date of Patent: Nov. 7, 2017

(54) RECREATIONAL VEHICLE HOLDING TANK DRAIN CLEARING ASSEMBLY

(71) Applicant: Randy Gehring, Clarkston, WA (US)

(72) Inventor: Randy Gehring, Clarkston, WA (US)

( * ) Notice: Subject to any disclaimer, the term of this patent is extended or adjusted under 35 U.S.C. 154(b) by 0 days.

(21) Appl. No.: 15/218,253

(22) Filed: Jul. 25, 2016

(51) Int. Cl.
| E03D 9/00 | (2006.01) |
| E03C 1/304 | (2006.01) |
| B60R 15/00 | (2006.01) |
| B60P 3/32 | (2006.01) |

(52) U.S. Cl.
CPC .............. *E03C 1/304* (2013.01); *B60P 3/32* (2013.01); *B60R 15/00* (2013.01)

(58) Field of Classification Search
CPC .................................................... E03C 1/304
USPC ........................................... 4/255.01, 255.06
See application file for complete search history.

(56) References Cited

U.S. PATENT DOCUMENTS

| 3,923,657 | A | 12/1975 | Roser | |
| 5,452,819 | A | 9/1995 | Vance | |
| D386,327 | S | 11/1997 | Rotchin | |
| 6,328,289 | B1 | 12/2001 | Becchi | |
| 8,241,497 | B2 | 8/2012 | Buch et al. | |
| 8,286,275 | B2 * | 10/2012 | Kipp | E03C 1/12 137/245.5 |
| 8,523,019 | B2 | 9/2013 | Drobot et al. | |
| 8,967,183 | B2 * | 3/2015 | Oakner | F24F 13/222 134/102.2 |
| 9,273,453 | B2 * | 3/2016 | Kipp | E03C 1/12 |
| 2003/0173687 | A1 | 9/2003 | Baumann | |
| 2005/0283890 | A1 * | 12/2005 | Schaaf | E03C 1/30 4/255.01 |

FOREIGN PATENT DOCUMENTS

WO     2011141773     11/2011

* cited by examiner

*Primary Examiner* — Huyen Le

(57) ABSTRACT

A recreational vehicle holding tank drain clearing assembly includes a tube having a first end, a second end and a perimeter wall. A first mating member is attached to the first and engages a first connecting member of a holding tank drain. A second mating member is attached to the second end and engages a drainage conduit. A cap is removably coupled to the second end of the tube. An air inlet is mounted on the cap and is fluidly coupled to the tube. A closure is mounted on the tube and is positioned in a first position preventing fluid movement through the tube or in a second position allowing fluid movement through the tube. Air is injected into the tube through the air inlet such that the air removes material trapped in the holding tank drain to increase flow from the holding tank through the holding tank drain.

5 Claims, 5 Drawing Sheets

1

RECREATIONAL VEHICLE HOLDING TANK DRAIN CLEARING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98.

The disclosure and prior art relates to waste tank drain clearing devices and more particularly pertains to a new waste tank drain clearing device for removing blockages of waste material found within a drain of a recreational vehicle holding tank.

BRIEF SUMMARY OF THE INVENTION

An embodiment of the disclosure meets the needs presented above by generally comprising a tube having a first end, a second end and a perimeter wall extending between the first and second ends. Each of the first and second ends is open. A first mating member is attached to the first end and is configured to releasably engage a first connecting member of a holding tank drain to fluidly couple a holding tank to the tube. A second mating member is attached to the second end and is configured to releasably engage a second connecting member of a drainage conduit to fluidly couple the tube to the drainage conduit. A cap is removably coupled to the second end of the tube. An air inlet is mounted on the cap and is fluidly coupled to the tube when the cap is mounted on the tube. A closure is mounted on the tube and is positioned in a first position preventing fluid movement through the tube or in a second position allowing fluid movement through the tube. Air is injected into the tube through the air inlet such that the air removes material in the holding tank drain to increase flow from the holding tank through the holding tank drain.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
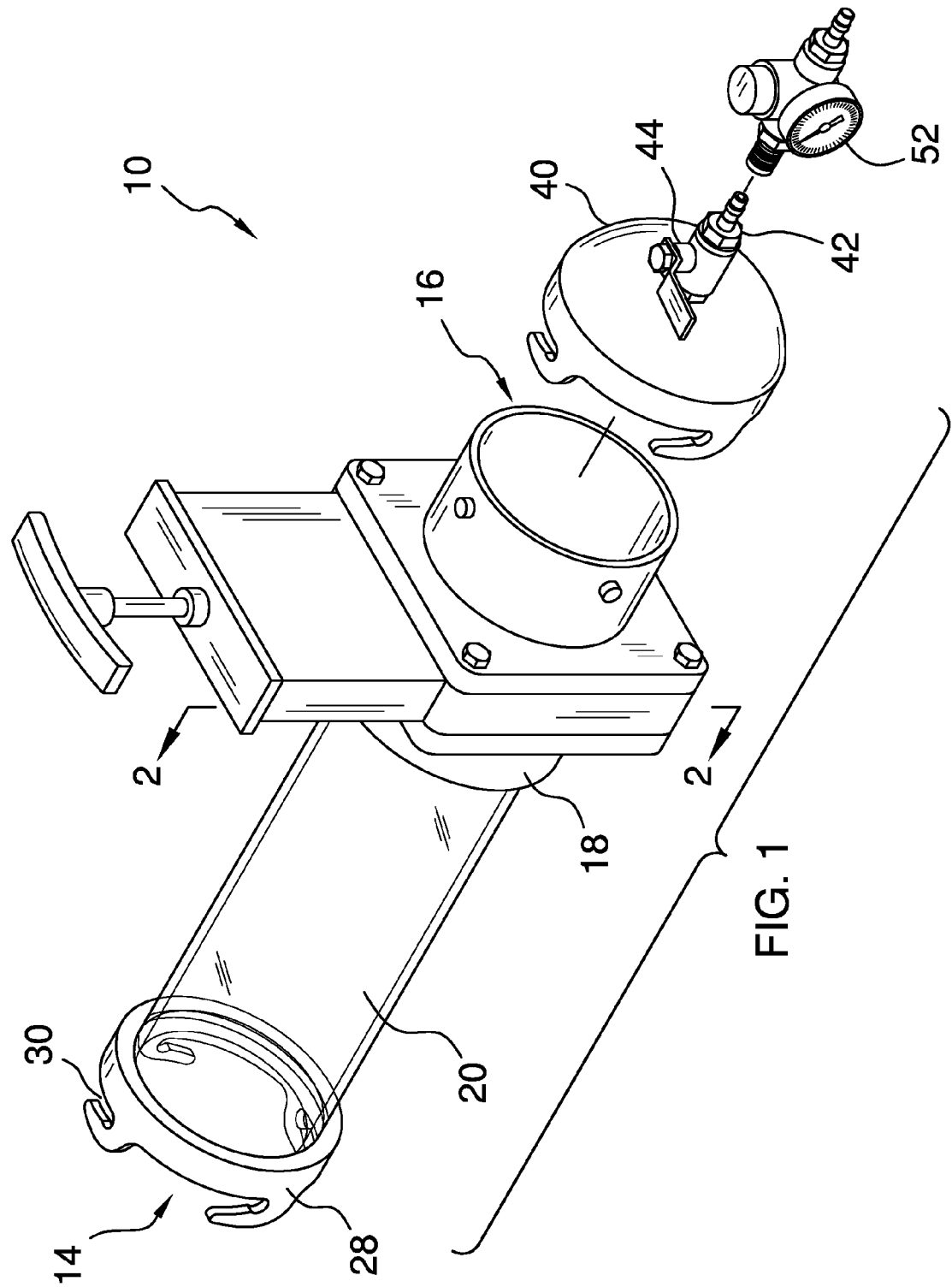
FIG. 1 is a rear perspective view of a recreational vehicle holding tank drain clearing assembly according to an embodiment of the disclosure.
Figure 2:
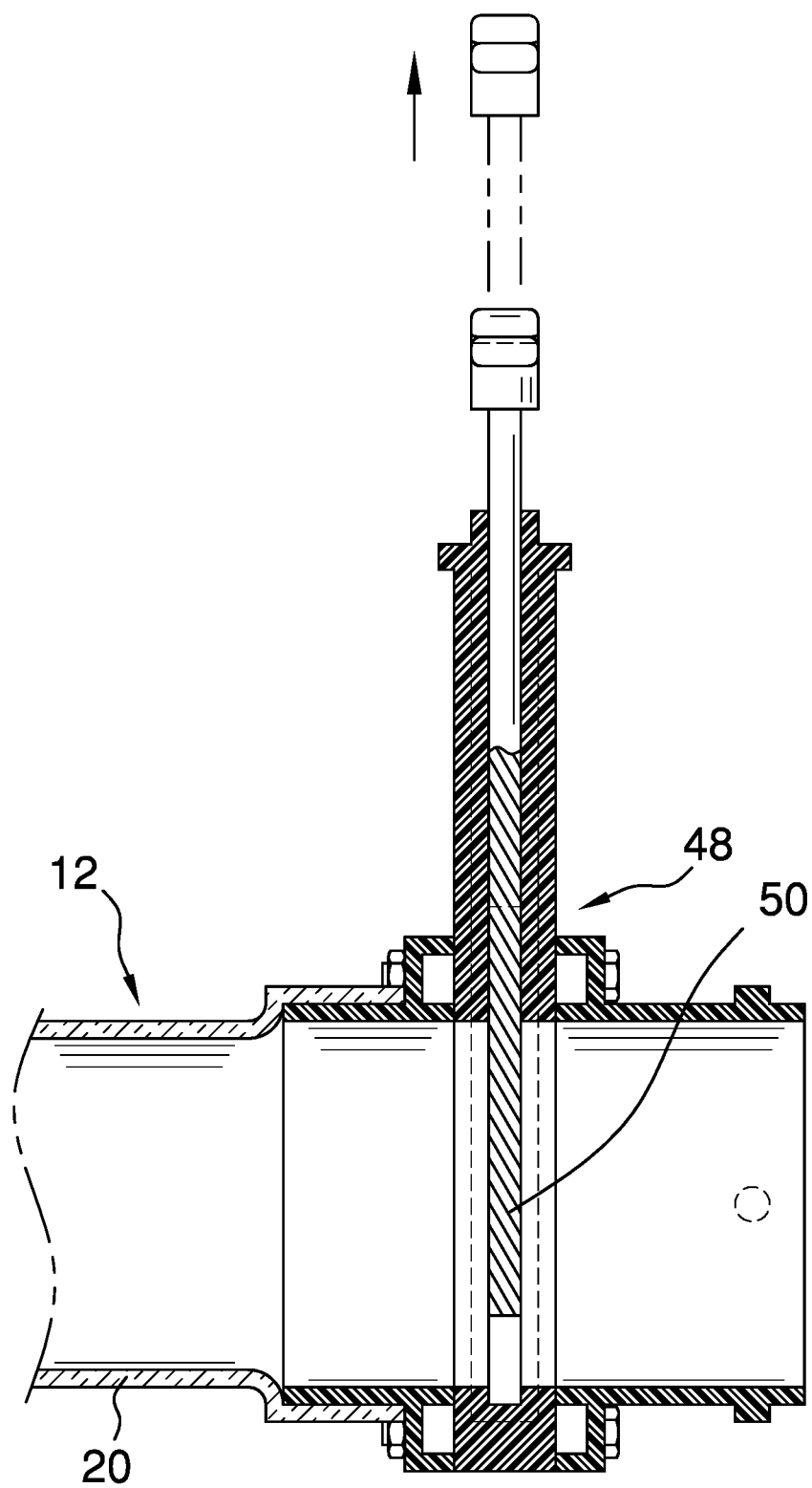
FIG. 2 is a cross-sectional view of an embodiment of the disclosure taken along line 2-2 of FIG. 1.
Figure 3:
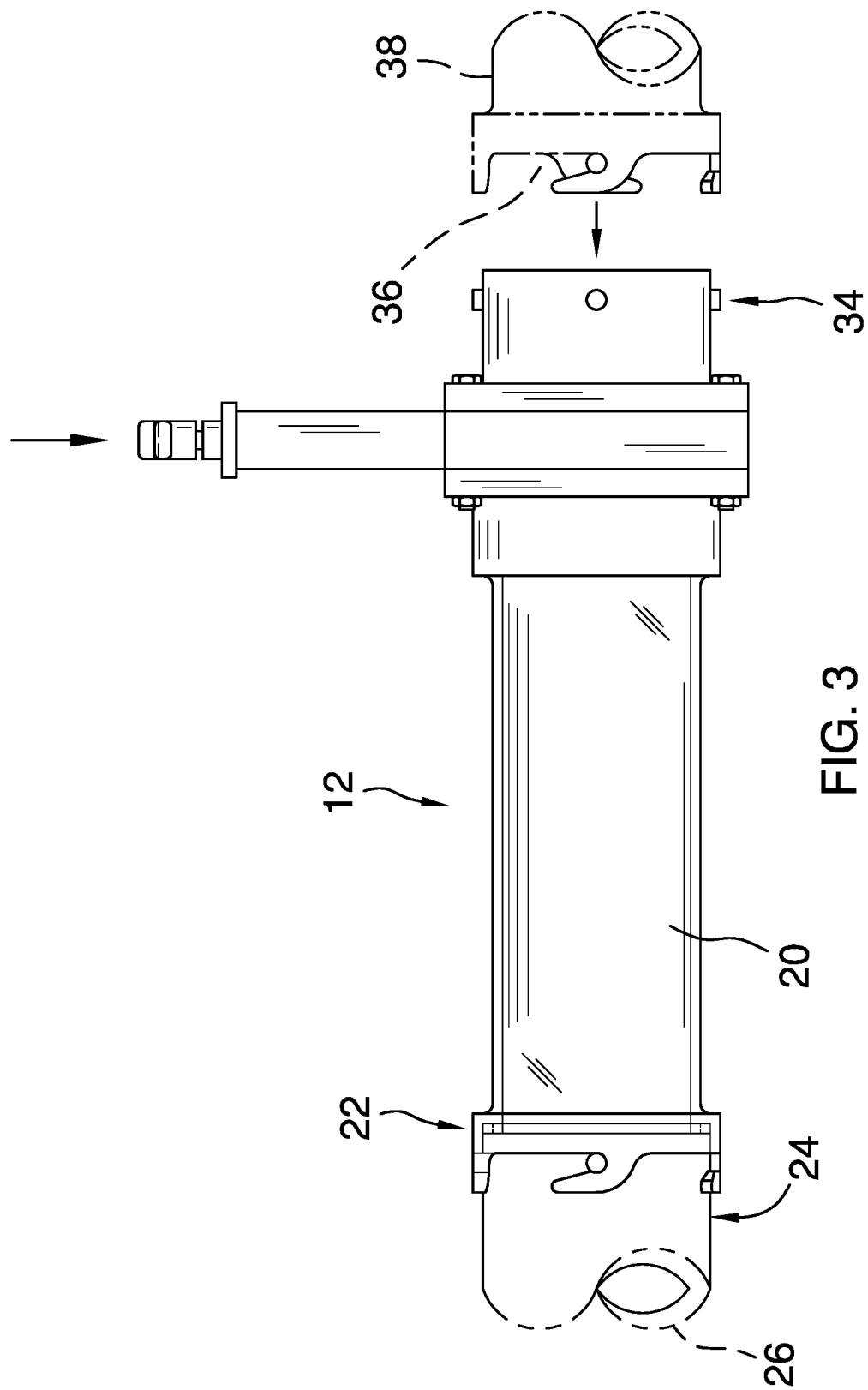
FIG. 3 is a side view of an embodiment of the disclosure.
Figure 4:
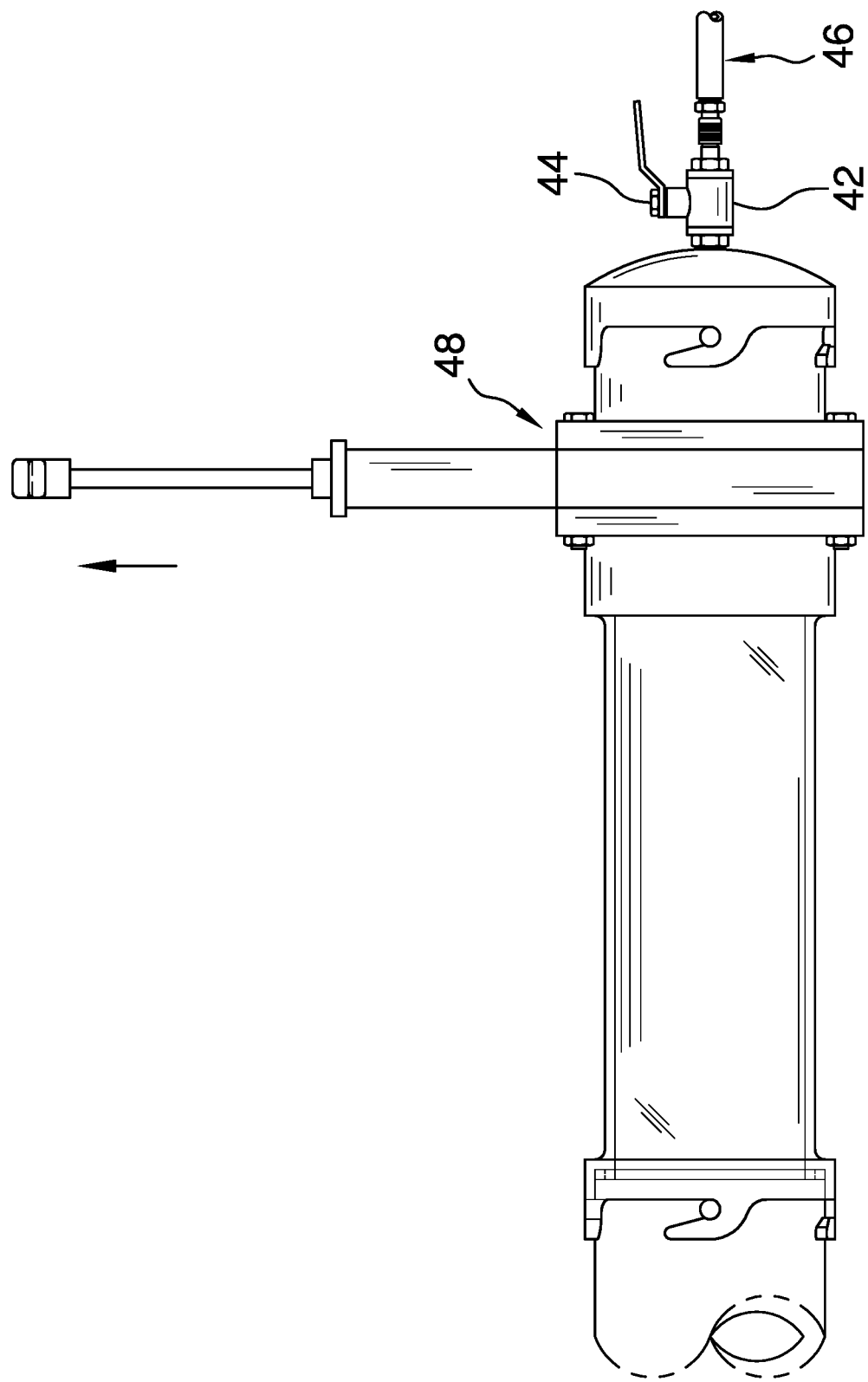
FIG. 4 is a side view of an embodiment of the disclosure.
Figure 5:
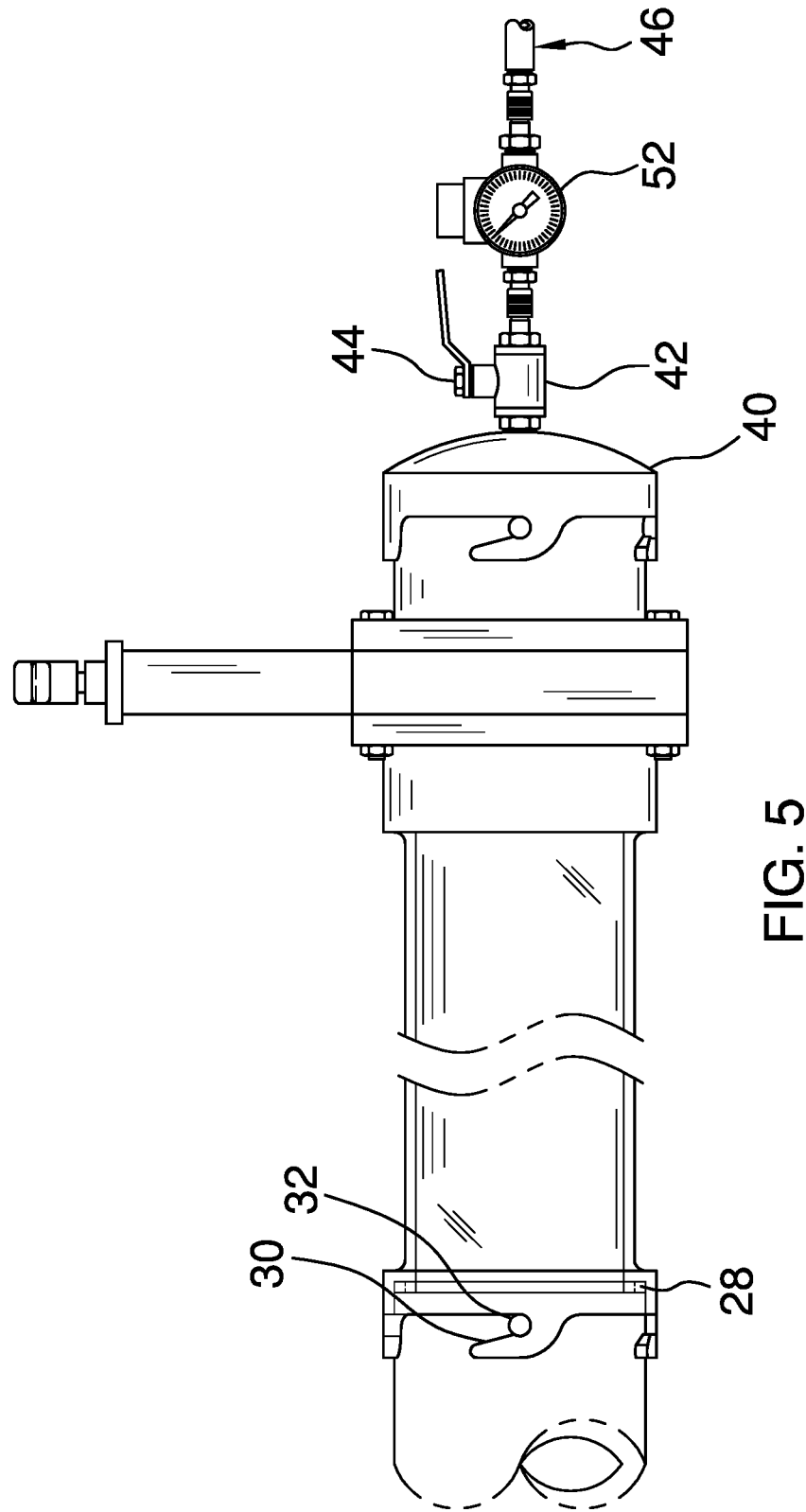
FIG. 5 is a side view of an embodiment of the disclosure.

With reference now to the drawings, and in particular to FIGS. 1 through 5 thereof, a new waste tank drain clearing device embodying the principles and concepts of an embodiment of the disclosure and generally designated by the reference numeral 10 will be described.

As best illustrated in FIGS. 1 through 5, the recreational vehicle holding tank drain clearing assembly 10 generally comprises a tube 12 that has a first end 14, a second end 16 and a perimeter wall 18 extending between the first 14 and second 16 ends. The tube 12 is substantially rigid and each of the first 14 and second 16 ends is open. The perimeter wall 18 includes a transparent section 20 to allow viewing into an interior of the tube 12.

A first mating member 22 is attached to the first end 14 and is configured to releasably engage a first connecting member 24 of a holding tank drain 26 to fluidly couple a holding tank of a recreational vehicle to the tube 12. The holding tank would generally be positioned within a conventional recreational vehicle and holds waste fluids and material from toilets, showers, sinks and the like that are used with the recreational vehicle and fluidly coupled to the holding tank. The holding tank, as would be commonly understood in the art of recreational vehicles, must be emptied from time to time. The first mating member 22 may include a sleeve 28 for receiving the holding tank drain 26 and the sleeve 28 includes notches 30 for receiving detents 32 positioned on the holding tank drain 26.

A second mating member 34 is attached to the second end 16 and is configured to releasably engage a second connecting member 36 of a drainage conduit 38 to fluidly couple the tube 12 to the drainage conduit 38. A cap 40 is removably coupled to the second end 16 of the tube 12. The second connecting member 36 and the cap 40 would each have a structure similar in design and operation as the first mating member 22 so that the second connecting member 36 and cap 40 would connect to the tube 12 in the same manner that the tube 12 is coupled to the holding tank drain 26. Thus the drainage conduit 38 may be connected to the tube 12 or directly to the holding tank drain 26. The second mating member 34 would likewise have a similar design and operation as the first connecting member 24 of the holding tank drain 26 to removably receive the cap 40 or the drainage conduit 38. Each of the first mating member 22 and cap 40 may include a shroud, not shown, extending over their respective sleeves 28.

An air inlet 42 is mounted on the cap 40. The air inlet 42 is fluidly coupled to the tube 12 when the cap 40 is mounted on the tube 12. The air inlet 42 allows a user of the assembly 10 to inject air under high pressure into the tube 12 to remove blockages found within the holding tank drain 26. A valve 44 is mounted on and is fluidly coupled to the air inlet 42. The valve 44 is positionable in a closed position to close the air inlet 42 or in an open position to open the air inlet 42. A source 46 of compressed air may be coupled to the air inlet 42 in a conventional fashion and the valve 44 used to allow the compressed air to be injected as needed into the tube 12. The source 46 of compressed air may include a tank or canister of compressed air or an air compressor. A closure 48 is mounted on the tube 12 and is positioned in a first position preventing fluid movement through the tube 12 or in a second position allowing fluid movement through the tube 12. The closure 48 is positioned nearer to the second end 16 than the first end 14 and may comprise a simple gate 50 structure that may be used block fluidic connectivity between the first 14 and second 16 ends. An air regulator 52 is mounted to the air inlet 42. The air regulator 52 is configured to regulate pressure of air injected into the air inlet 42. Specifically, the air injected into the tube 12 should have a pressure between 25 psi and 50 psi and it may be preferred that the air pressure not exceed 50 psi to prevent damage to the holding tank and to prevent fluids from being moved outwardly of the holding tank and into the recreational vehicle.

In use, the tube 12 is connected to the holding tank drain 26 with the closure 48 placed in the closed position. The holding tank drain 26 will include a valve, not shown, which is opened. If the material from the holding tank flows freely into the tube 12, the drainage conduit 38 may be coupled to the second end 16, the closure opened and the material allowed to drain. Should it not flow freely, the cap 40 may be positioned on the second end 16 and compressed air connected to the air inlet 42. The valve 44 on the air inlet 42 is opened so that air is injected into the tube 12 through the air inlet 42 such that the air removes material in the holding tank drain 26 to increase flow from the holding tank through the holding tank drain 26. Once the blockage has been cleared, the closure 48 is closed, the drain conduit 38 is connected to the second end 16 and the closure 48 opened to allow the material to flow outwardly of the holding tank, through the holding tank drain 26 and tube 12 and into the drain conduit 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A recreational vehicle holding tank unplugging assembly comprising:
    a tube having a first end, a second end and a perimeter wall extending between said first and second ends, each of said first and second ends being open;
    a first mating member being attached to said first end and being configured to releasably engage a first connecting member of a holding tank drain to fluidly couple a holding tank to said tube;
    a second mating member being attached to said second end and being configured to releasably engage a second connecting member of a drainage conduit to fluidly couple said tube to said drainage conduit;
    a cap being removably coupled to said second end of said tube;
    an air inlet being mounted on said cap, said air inlet being fluidly coupled to said tube when said cap is mounted on said tube;
    a closure being mounted on said tube, said closure being positioned in a first position preventing fluid movement through said tube or in a second position allowing fluid movement through said tube; and
    wherein air is injected into said tube through said air inlet such that the air removes material in the holding tank drain to increase flow from the holding tank through the holding tank drain.

2. The recreational vehicle holding tank unplugging assembly according to claim 1, wherein said perimeter wall includes a transparent section to allow viewing into an interior of said tube.

3. The recreational vehicle holding tank unplugging assembly according to claim 1, further including a valve being mounted on and being fluidly coupled to said air inlet, said valve being positionable in a closed position to close said air inlet or in an open position to open said air inlet.

4. The recreational vehicle holding tank unplugging assembly according to claim 1, further including an air regulator being mounted to said air inlet, said air regulator being configure to regulate pressure of air injected into said air inlet.

5. A recreational vehicle holding tank unplugging assembly comprising:
    a tube having a first end, a second end and a perimeter wall extending between said first and second ends, each of said first and second ends being open, said perimeter wall including a transparent section to allow viewing into an interior of said tube;
    a first mating member being attached to said first end and being configured to releasably engage a first connecting member of a holding tank drain to fluidly couple a holding tank to said tube;
    a second mating member being attached to said second end and being configured to releasably engage a second connecting member of a drainage conduit to fluidly couple said tube to said drainage conduit;
    a cap being removably coupled to said second end of said tube;

an air inlet being mounted on said cap, said air inlet being fluidly coupled to said tube when said cap is mounted on said tube;

a valve being mounted on and being fluidly coupled to said air inlet, said valve being positionable in a closed position to close said air inlet or in an open position to open said air inlet;

a closure being mounted on said tube, said closure being positioned in a first position preventing fluid movement through said tube or in a second position allowing fluid movement through said tube;

an air regulator being mounted to said air inlet, said air regulator being configure to regulate pressure of air injected into said air inlet; and wherein air is injected into said tube through said air inlet such that the air removes material in the holding tank drain to increase flow from the holding tank through the holding tank drain.

\* \* \* \* \*